United States Patent
Krot et al.

(10) Patent No.: US 12,528,392 B2
(45) Date of Patent: Jan. 20, 2026

(54) VEHICLE SEAT HAVING KNEEL FUNCTION

(71) Applicant: GM GLOBAL TECHNOLOGY OPERATIONS LLC, Detroit, MI (US)

(72) Inventors: Joseph A. Krot, Lake Orion, MI (US); Walter Holzhueter, Southgate, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 18/359,262

(22) Filed: Jul. 26, 2023

(65) Prior Publication Data

US 2025/0033541 A1    Jan. 30, 2025

(51) Int. Cl.
B60N 2/30    (2006.01)

(52) U.S. Cl.
CPC ............ B60N 2/309 (2013.01); B60N 2/3011 (2013.01); B60N 2/3065 (2013.01)

(58) Field of Classification Search
CPC ..... B60N 2/309; B60N 2/3011; B60N 2/3065
See application file for complete search history.

(56) References Cited

U.S. PATENT DOCUMENTS

| | | | |
|---|---|---|---|
| 8,186,737 B2 | 5/2012 | Jungert et al. | |
| 10,351,019 B2* | 7/2019 | Keyser | B60N 2/02246 |
| 10,406,948 B2 | 9/2019 | Furukawa et al. | |
| 11,001,172 B2* | 5/2021 | Cluet | B60N 2/3011 |
| 11,167,666 B2* | 11/2021 | Epaud | B60N 2/3013 |
| 11,351,891 B2* | 6/2022 | Bouzid | B60N 2/0244 |
| 12,103,440 B2* | 10/2024 | Kim | B60N 2/3065 |
| 2011/0316317 A1* | 12/2011 | Sprenger | B60N 2/3011 |
| | | | 297/344.1 |

FOREIGN PATENT DOCUMENTS

| | | |
|---|---|---|
| DE | 112011104472 T5 | 9/2013 |
| DE | 102014214563 A1 | 11/2015 |

OTHER PUBLICATIONS

German Office Action for German Application No. 102023128157.7; dated Mar. 4, 2024; 7 pages.
German Office Action for German Application No. 102023128157.7; dated Mar. 24, 2025; 5 pages.

* cited by examiner

*Primary Examiner* — Syed A Islam
(74) *Attorney, Agent, or Firm* — CANTOR COLBURN LLP (57) ABSTRACT

A seat assembly for a vehicle includes a seat including a seat base and a seat back, and a seat back hinge connecting the seat back to the seat back and configured to allow for rotation of the seat back relative to the seat base. A rail assembly is operably connected to the seat to guide a forward/aft adjustment of a position of the seat in a direction parallel to a direction of the rail assembly. A forward bracket operably connects the seat to the rail assembly at a forward portion of the seat, and a rearward bracket operably connects the seat to the rail assembly at a rearward portion of the seat. The rearward bracket is configured to selectably rotate about a rear rail pivot to selectably lower the rearward portion of the seat relative to the rail assembly.

15 Claims, 6 Drawing Sheets

VEHICLE SEAT HAVING KNEEL FUNCTION

INTRODUCTION

The subject disclosure relates to vehicle seat systems, and more particularly to position and orientation adjustment of vehicle seats.

In vehicles having multiple rows of seats, such as a van, sport utility vehicle or a sedan, a second row seat and or a third row seat may be stowed by folding a seat back down in order to increase the cargo carrying capacity of the vehicle. Additionally, when the seat is folded it is desired that resulting cargo loading surface is relatively low and relatively flat in order to improve the ease of loading cargo onto the cargo loading surface. Currently, to provide a relatively low and flat cargo loading surface, the seat base cushion is often moved and stowed to reduce the height of the folded seat back.

SUMMARY

In one exemplary embodiment, a seat assembly for a vehicle includes a seat including a seat base and a seat back, and a seat back hinge connecting the seat back to the seat back and configured to allow for rotation of the seat back relative to the seat base. A rail assembly is operably connected to the seat to guide a forward/aft adjustment of a position of the seat in a direction parallel to a direction of the rail assembly. A forward bracket operably connects the seat to the rail assembly at a forward portion of the seat, and a rearward bracket operably connects the seat to the rail assembly at a rearward portion of the seat. The rearward bracket is configured to selectably rotate about a rear rail pivot to selectably lower the rearward portion of the seat relative to the rail assembly.

In addition to one or more of the features described herein, a pivot lock selectably prevents rotation of the rearward bracket about the rear rail pivot.

In addition to one or more of the features described herein, the pivot lock is configured such that rotation of the seat back into a folded position at the seat base triggers release of the pivot lock.

In addition to one or more of the features described herein an adjustment motor is operably connected to the rearward bracket to drive rotation of the rearward bracket about the rear rail pivot.

In addition to one or more of the features described herein, the adjustment motor further urges forward/aft adjustment of the position of the seat.

In addition to one or more of the features described herein, the rearward bracket is configured to rotate about the rear rail pivot only when the seat back is rotated into a folded position at the seat base.

In addition to one or more of the features described herein, a forward rail pivot connecting the forward bracket to the rail assembly. The forward bracket is rotated about the forward rail pivot when the rearward bracket is rotated about the rearward rail pivot.

In another exemplary embodiment, a vehicle includes a vehicle body defining a passenger compartment, and a plurality of seat assemblies located in the passenger compartment. At least one seat assembly of the plurality of seat assemblies includes a seat including a seat base, a seat back, and a seat back hinge connecting the seat back to the seat back and configured to allow for rotation of the seat back relative to the seat base. A rail assembly is operably connected to the seat to guide a forward/aft adjustment of a position of the seat in a direction parallel to a direction of the rail assembly. A forward bracket operably connects the seat to the rail assembly at a forward portion of the seat, and a rearward bracket operably connects the seat to the rail assembly at a rearward portion of the seat. The rearward bracket is configured to selectably rotate about a rear rail pivot to selectably lower the rearward portion of the seat relative to the rail assembly.

In addition to one or more of the features described herein, a pivot lock selectably prevents rotation of the rearward bracket about the rear rail pivot.

In addition to one or more of the features described herein, the pivot lock is configured such that rotation of the seat back into a folded position at the seat base triggers release of the pivot lock.

In addition to one or more of the features described herein, an adjustment motor is operably connected to the rearward bracket to drive rotation of the rearward bracket about the rear rail pivot.

In addition to one or more of the features described herein, the adjustment motor further urges forward/aft adjustment of the position of the seat.

In addition to one or more of the features described herein, the rearward bracket is configured to rotate about the rear rail pivot only when the seat back is rotated into a folded position at the seat base.

In addition to one or more of the features described herein, a forward rail pivot connects the forward bracket to the rail assembly. The forward bracket is rotated about the forward rail pivot when the rearward bracket is rotated about the rearward rail pivot.

In addition to one or more of the features described herein, the at least one seat assembly is one of a second row seat or a third row seat of the vehicle.

In addition to one or more of the features described herein, rotating the rearward bracket about the rearward rail pivot lowers the seat base and moves the seat base aftward in the vehicle position.

In yet another exemplary embodiment, a method of operating a seat assembly of a vehicle includes providing a seat assembly in a vehicle. The seat assembly includes a seat including a seat base, a seat back, and a seat back hinge connecting the seat back to the seat back and configured to allow for rotation of the seat back relative to the seat base. A rail assembly is operably connected to the seat to guide a forward/aft adjustment of a position of the seat in a direction parallel to a direction of the rail assembly. A forward bracket operably connects the seat to the rail assembly at a forward portion of the seat, and a rearward bracket operably connects the seat to the rail assembly at a rearward portion of the seat. The rearward bracket is selectably rotated about a rear rail pivot to selectably lower the rearward portion of the seat relative to the rail assembly.

In addition to one or more of the features described herein, the seat back is selectably rotated about the seat back hinge into a folded position at the seat base, thereby at least partially defining a cargo loading surface of the vehicle.

In addition to one or more of the features described herein a pivot lock is released to allow for rotation of the rearward bracket about the rear rail pivot.

In addition to one or more of the features described herein an adjustment motor is activated to urge rotation of the rearward bracket about the rear rail pivot.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
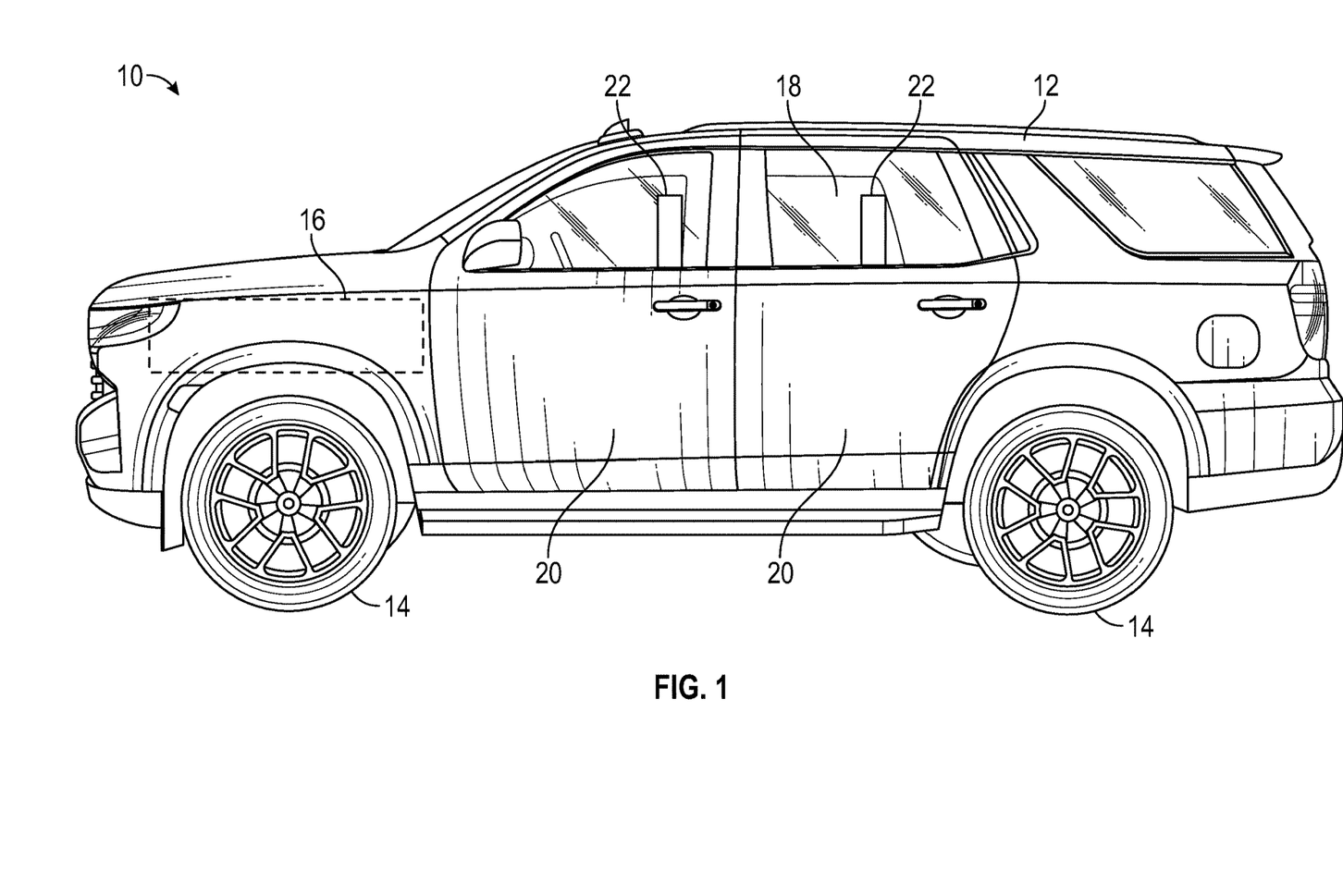
FIG. 1 is an illustration of an embodiment of a vehicle.

In accordance with an exemplary embodiment, a vehicle 10 is illustrated in FIG. 1. The vehicle 10 includes a vehicle body 12 supported by a plurality of wheels 14. A power system 16, such as an internal combustion engine, an electric motor, or a hybrid system is operably connected to the plurality of wheels 14 to drive the plurality of wheels 14. The body 12 defines an occupant compartment 18 inside of the body 12, and one or more doors 20 are provided for occupant entry and exit of the occupant compartment 18 by the occupant. A plurality of rows of seat assemblies 22 are positioned in the occupant compartment 18.

Figure 2:
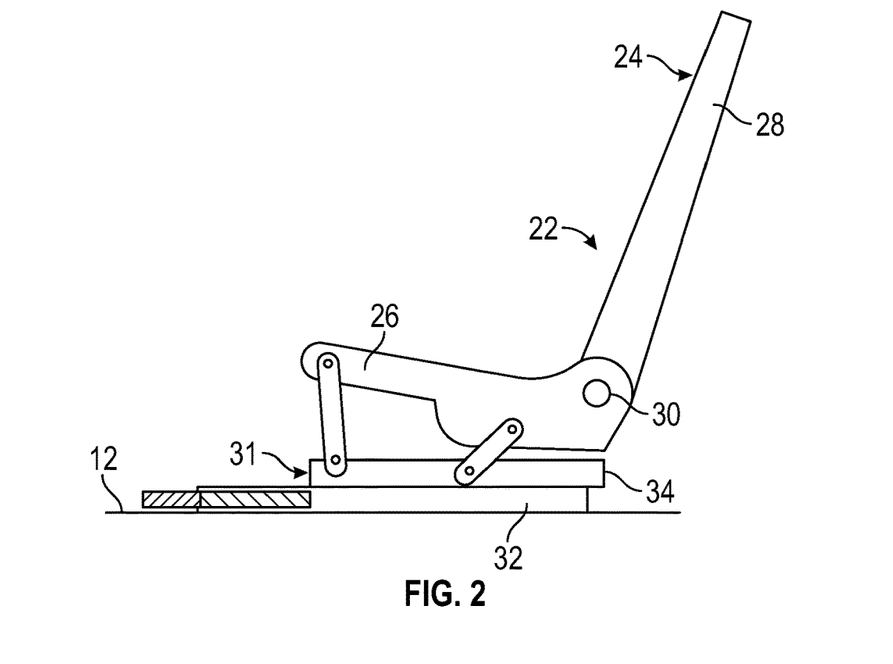
FIG. 2 is an illustration of an embodiment of a seat assembly.
Figure 3:
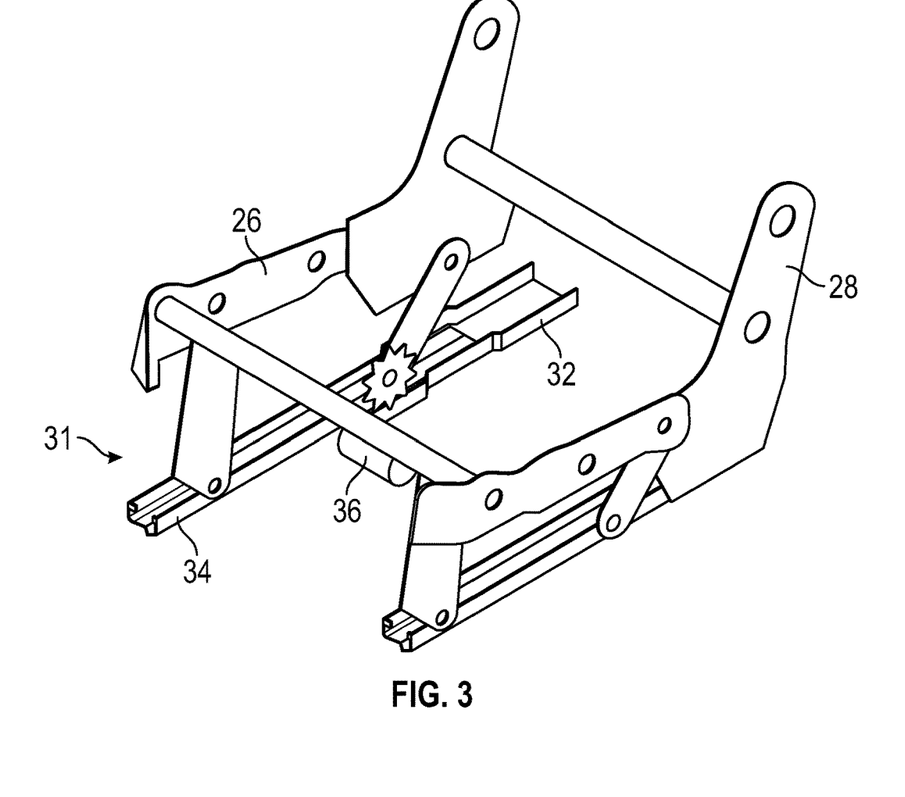
FIG. 3 is an illustration of an embodiment of a seat base.

Referring now to FIG. 2, the seat assembly 22 includes a seat 24 including a seat base 26 and a seat back 28. In some embodiments, a seat back hinge 30 connects the seat back 28 to the seat base 26 allowing for adjustment of a position of the seat back 28 relative to the seat base 26. The seat 24 is connected to a seat adjuster 31 that allows for forward and aft adjustment of a seat position relative to the body 12. The seat adjuster 31 includes a floor rail 32 fixed to the body 12 and a seat rail 34 operably connected to the seat 24 and slidably installed to the floor rail 32. As illustrated in FIG. 3, the seat adjuster 31 includes a seat motor 36 that urges the seat 24 forward and aft with the seat rail 34 and the floor rail 32 guiding the forward and aft movement.

Figure 4:
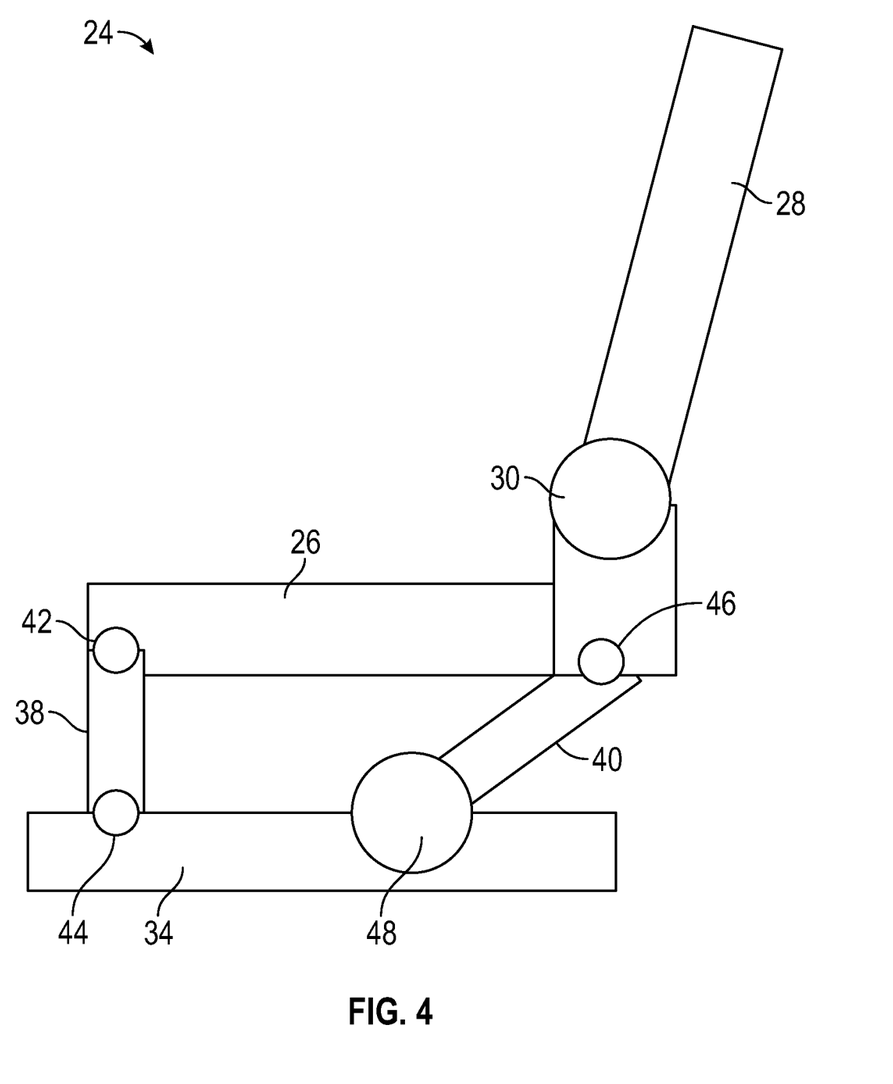
FIG. 4. is a schematic view of an embodiment of a seat assembly in a seating position.
Figure 5:
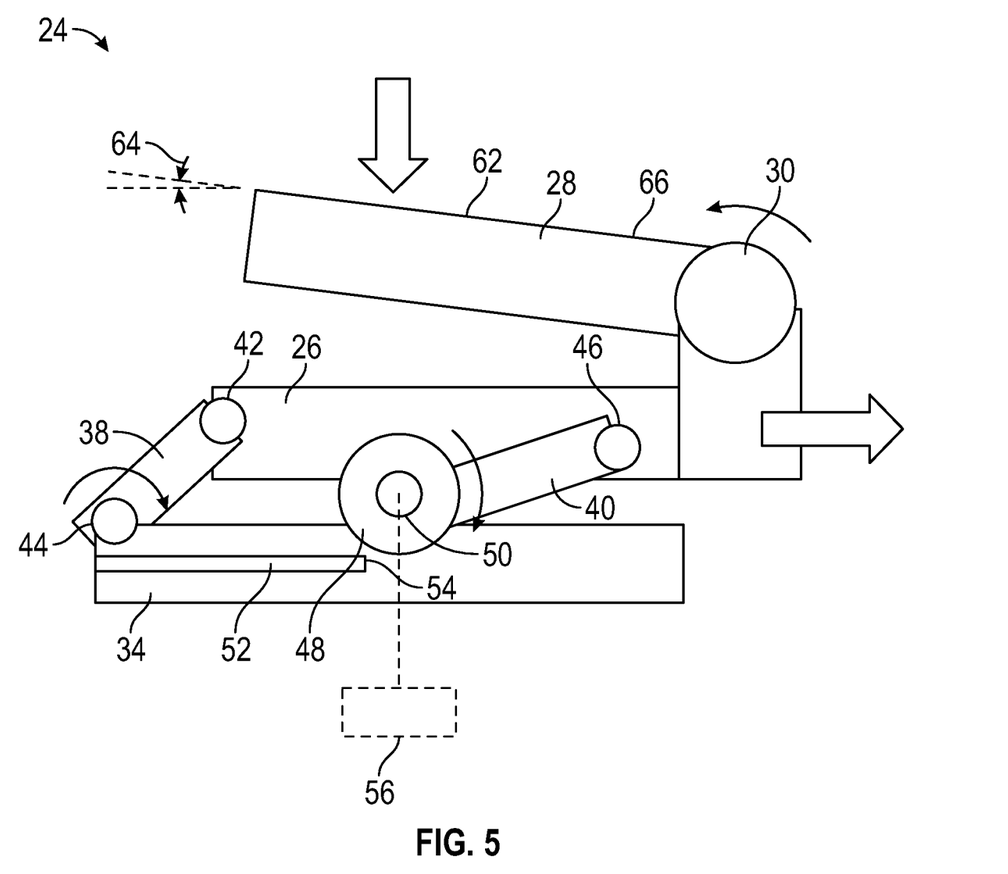
FIG. 5 is a schematic view of an embodiment of a seat assembly in a cargo position.

The seat 24 is operable in a cargo mode as illustrated in FIGS. 4 and 5. The seat 24 is operably connected to the seat rail 34 via a forward bracket 38 and a rearward bracket 40. The forward bracket 38 is connected to the seat 24 via a forward seat pivot 42 and is connected to the seat rail 34 via a forward rail pivot 44. Similarly the rearward bracket 40 is connected to the seat 24 via a rearward seat pivot 46 and is connected to the seat rail 34 via a rearward rail pivot 48. To move the seat 24 from a normal position, such as shown in FIG. 4, to a cargo position as shown in FIG. 5, the seat back 28 is moved about the seat back hinge 30 downward toward the seat base 26, via rotation in a counterclockwise direction as illustrated in FIG. 5. Additionally, the seat 24 is moved rearward and downward toward the floor rail 32. This movement is achieved by movement of the forward bracket 38 about the forward rail pivot 44 and by rotating the rearward bracket 40 about the rearward rail pivot 48. In the view of FIG. 5, the rotation of the brackets 38 and 40 about the respective rail pivots 44 and 48 is in a clockwise direction.

In some embodiments, the movement is driven by an adjustment motor 50 operably connected to the rearward bracket 40 at, for example, the rearward rail pivot 48. Activation of the adjustment motor 50 drives rotation of the rearward bracket 40 about the rearward rail pivot 48 between the normal position of FIG. 4 and the cargo position of FIG. 5. The forward bracket 38 is urged about the forward rail pivot 44 by the movement of the seat base 26 in the rearward direction due to the movement of the rearward bracket 40 about the rearward rail pivot 48. In some embodiments, the adjustment motor 50 may be the same motor as the seat motor 36, and may drive both forward and aft adjustment of the seat position, and also movement of the seat 24 into the cargo position. In one embodiment, when the seat 24 is moved through its forward-aft adjustment range 52 and reaches the most rearward point 54 of the adjustment range 52, continued activation of the seat motor 36 via, for example, an adjustment switch 56, moves the rearward bracket 40 about the rearward rail pivot 48.

Figure 6:
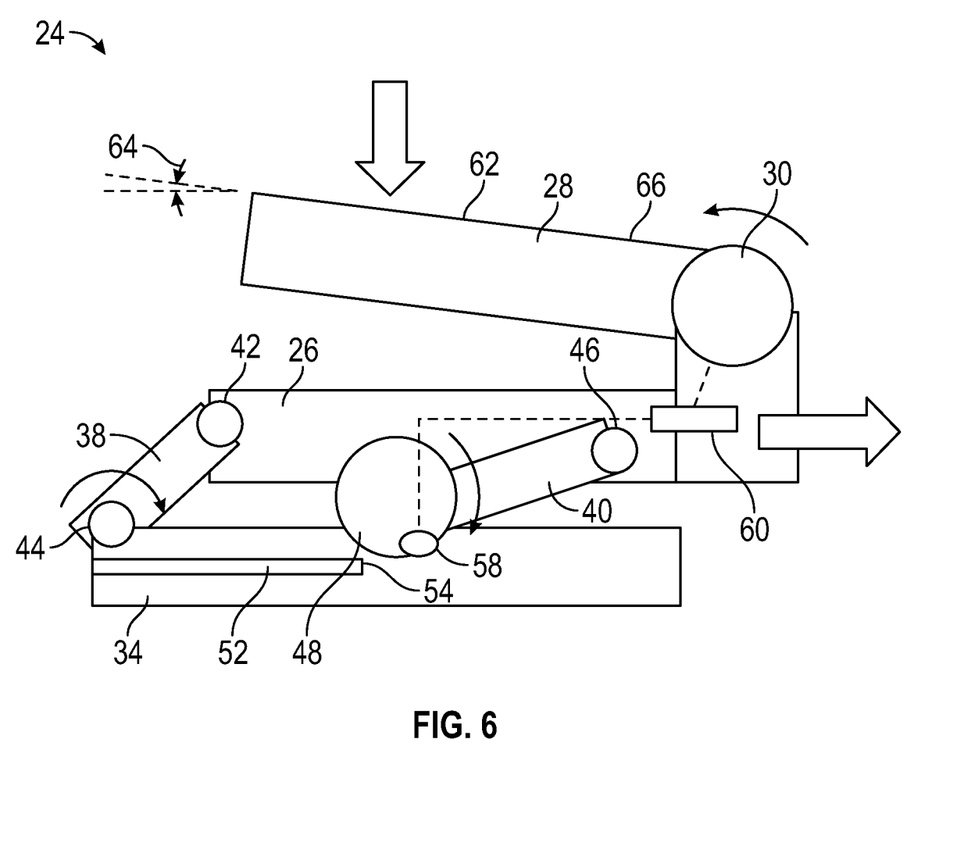
FIG. 6 is a schematic view of another embodiment of a seat assembly in a cargo position.

While in the embodiment of FIG. 5, the movement is achieved via the adjustment motor 50, in another embodiment as illustrated in FIG. 6, the movement may be achieved via manual operation by a user. In this embodiment, the rearward bracket 40 is locked in position relative to the rearward rail pivot 48 by a pivot lock 58. When the user releases the pivot lock 58, the rearward bracket 40 is free to rotate relative to the rearward rail pivot 48, and thus the seat 24 may be manually moved between the normal position of FIG. 4 and the cargo position as shown in FIG. 6.

Figure 7:
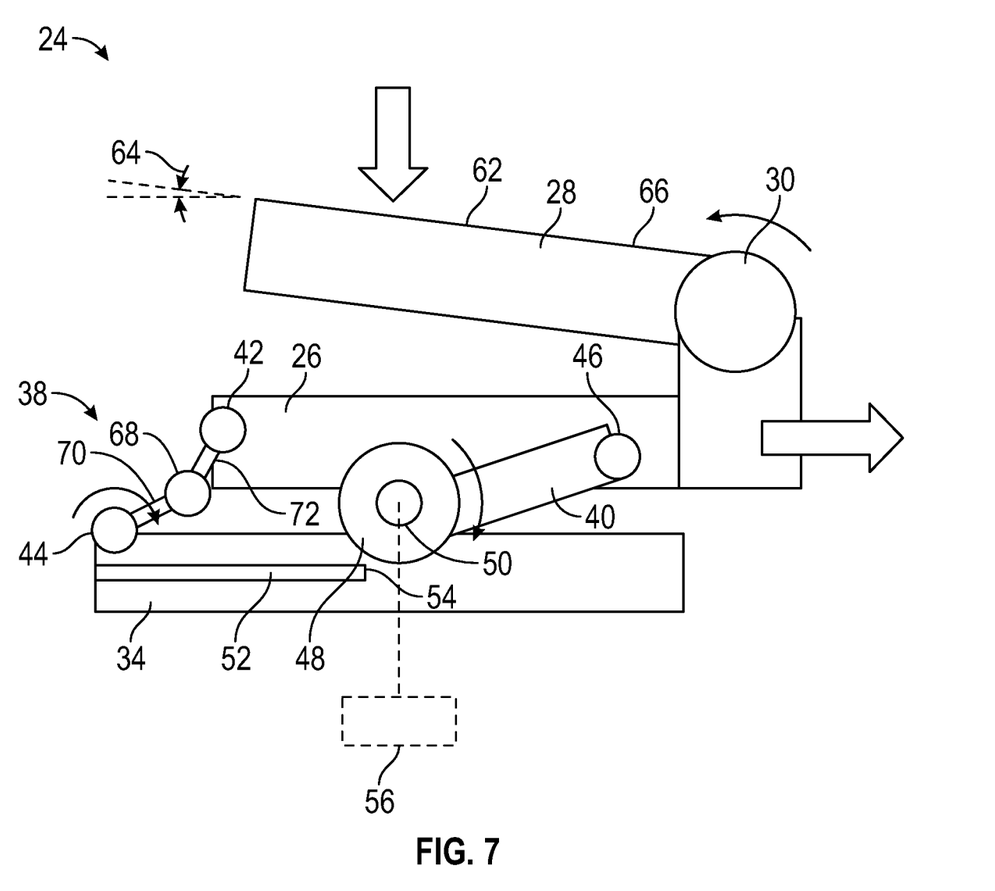
FIG. 7 is a schematic view of yet another embodiment of a seat assembly in a cargo position.

Referring now to FIG. 7, in other embodiments the forward bracket 38 includes a bracket pivot 68 located along the forward bracket 38 between the forward seat pivot 42 and the forward rail pivot 44, such that a first bracket portion 70 located at a first side of the bracket pivot 68 is rotatable relative to a second bracket portion 72 located at a second side of the bracket pivot 68. When the seat 24 is moved to the cargo position, the bracket pivot 68 articulates, which has the effect of further lowering a cargo loading surface 66 of the seat 24 and reducing a cargo surface angle 64 of the cargo surface.

In some embodiments, the rotation of the seat back 28 is independent from the movement of the seat base 26. In other embodiments, however, the folding of the seat back 28 toward the seat base 26 is linked to the movement of the seat base 26 to the cargo position. For example, as shown in FIG. 6, the seat back 28 may be connected to the pivot lock 58 by, for example, a linkage 60. The linkage 60 is configured to release the pivot lock 58 when the seat back 28 is folded to the seat base 26, allowing the seat base 26 to be moved to the cargo position. In other embodiments, the linkage may be configured to prevent releasing of the pivot lock 58 unless the seat back 28 is folded to the seat base 26.

Moving the seat base 26 downward and rearward into the cargo position via the rearward rail pivot 48 as illustrated in FIG. 5, lowers the cargo loading surface 66 defined at least in part by a rear seatback surface 62, and further may reduce the cargo surface angle 64, relative to portions of the cargo loading surface 66. This results in an improved ease of loading cargo onto the cargo loading surface.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat assembly for a vehicle, comprising:
    a seat including:
        a seat base:
        a seat back; and
        a seat back hinge connecting the seat back to the seat back and configured to allow for rotation of the seat back relative to the seat base;
    a rail assembly operably connected to the seat to guide a forward/aft adjustment of a position of the seat in a direction parallel to a direction of the rail assembly;
    a forward bracket operably connecting the seat to the rail assembly at a forward portion of the seat;
    a rearward bracket operably connecting the seat to the rail assembly at a rearward portion of the seat, the rearward bracket configured to selectably rotate about a rear rail pivot to selectably lower the rearward portion of the seat relative to the rail assembly; and
    an adjustment motor configured to urge the forward/aft adjustment of the position of the seat, wherein continued activation of the adjustment motor after the seat reaches a rearwardmost extent of an adjustment range moves the rearward bracket about the rear rail pivot.

2. The seat assembly of claim 1, further comprising a pivot lock to selectably prevent rotation of the rearward bracket about the rear rail pivot.

3. The seat assembly of claim 2, wherein the pivot lock is configured such that rotation of the seat back into a folded position at the seat base triggers release of the pivot lock.

4. The seat assembly of claim 1, wherein the rearward bracket is configured to rotate about the rear rail pivot only when the seat back is rotated into a folded position at the seat base.

5. The seat assembly of claim 1, further comprising a forward rail pivot connecting the forward bracket to the rail assembly, the forward bracket rotated about the forward rail pivot when the rearward bracket is rotated about the rear rail pivot.

6. A vehicle, comprising:
    a vehicle body defining a passenger compartment;
    a plurality of seat assemblies disposed in the passenger compartment, at least one seat assembly of the plurality of seat assemblies including:
        a seat including:
            a seat base:
            a seat back; and
            a seat back hinge connecting the seat back to the seat back and configured to allow for rotation of the seat back relative to the seat base;
        a rail assembly operably connected to the seat to guide a forward/aft adjustment of a position of the seat in a direction parallel to a direction of the rail assembly;
        a forward bracket operably connecting the seat to the rail assembly at a forward portion of the seat;
        a rearward bracket operably connecting the seat to the rail assembly at a rearward portion of the seat, the rearward bracket configured to selectably rotate about a rear rail pivot to selectably lower the rearward portion of the seat relative to the rail assembly; and
        an adjustment motor configured to urge the forward/aft adjustment of the position of the seat, wherein continued activation of the adjustment motor after the seat reaches a rearwardmost extent of an adjustment range moves the rearward bracket about the rear rail pivot.

7. The vehicle of claim 6, further comprising a pivot lock to selectably prevent rotation of the rearward bracket about the rear rail pivot.

8. The vehicle of claim 7, wherein the pivot lock is configured such that rotation of the seat back into a folded position at the seat base triggers release of the pivot lock.

9. The vehicle of claim 6, wherein the rearward bracket is configured to rotate about the rear rail pivot only when the seat back is rotated into a folded position at the seat base.

10. The vehicle of claim 6, further comprising a forward rail pivot connecting the forward bracket to the rail assembly, the forward bracket rotated about the forward rail pivot when the rearward bracket is rotated about the rear rail pivot.

11. The vehicle of claim 6, wherein the at least one seat assembly is one of a second row seat or a third row seat of the vehicle.

12. The vehicle of claim 6, wherein rotating the rearward bracket about the rear rail pivot lowers the seat base and moves the seat base aftward in the vehicle.

13. A method of operating a seat assembly of a vehicle comprising:
    providing a seat assembly in a vehicle, the seat assembly including:
        a seat including:
            a seat base:
            a seat back; and
            a seat back hinge connecting the seat back to the seat back and configured to allow for rotation of the seat back relative to the seat base;
        a rail assembly operably connected to the seat to guide a forward/aft adjustment of a position of the seat in a direction parallel to a direction of the rail assembly;
        a forward bracket operably connecting the seat to the rail assembly at a forward portion of the seat; and
        a rearward bracket operably connecting the seat to the rail assembly at a rearward portion of the seat;
    selectably rotating the rearward bracket about a rear rail pivot to selectably lower the rearward portion of the seat relative to the rail assembly;
    further comprising activating an adjustment motor to urge the forward/aft adjustment of the position of the seat, wherein continued activation of the adjustment motor after the seat reaches a rearwardmost extent of an adjustment range moves the rearward bracket about the rear rail pivot.

14. The method of claim 13, further comprising rotating the seat back about the seat back hinge into a folded position at the seat base, thereby at least partially defining a cargo loading surface of the vehicle.

15. The method of claim 13, further comprising releasing a pivot lock to allow for rotation of the rearward bracket about the rear rail pivot.

* * * * *